Aug. 28, 1951   L. G. NAUMANN   2,565,571
BRAKE CYLINDER CLOSURE
Filed Sept. 18, 1946

INVENTOR:
LEONARD G. NAUMANN
BY
ATTORNEY

Patented Aug. 28, 1951

2,565,571

UNITED STATES PATENT OFFICE 2,565,571

BRAKE CYLINDER CLOSURE

Leonard G. Naumann, Maplewood, Mo., assignor to Wagner Electric Corporation, St. Louis, Mo., a corporation of Delaware Application September 18, 1946, Serial No. 697,814

4 Claims. (Cl. 286—29)

This invention relates to pressure fluid devices such as brake or slave cylinders and in its more specific aspects is directed to closures for such cylinders.

The object of this invention is to provide a closure for a cylinder which can be readily installed and removed and which offers the maximum protection for the cylinder walls and cylinder closure.

Figure 1:
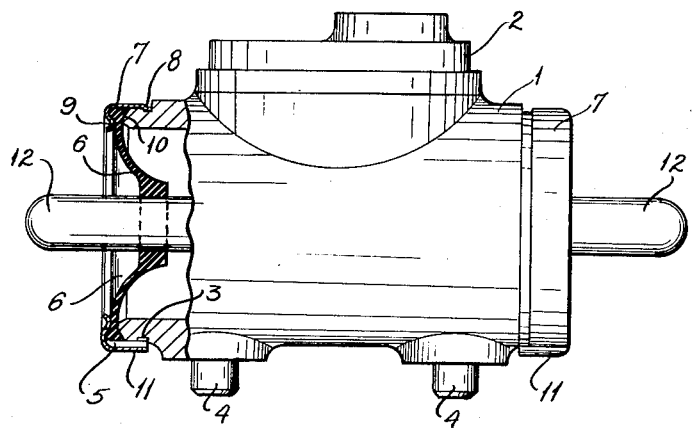
Figure 1 is a plan view, partly in section, of a slave cylinder incorporating the invention.
Figure 2:
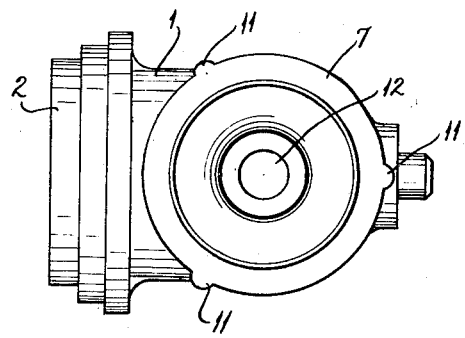
Figure 2 is an end elevation thereof.
Figure 3:
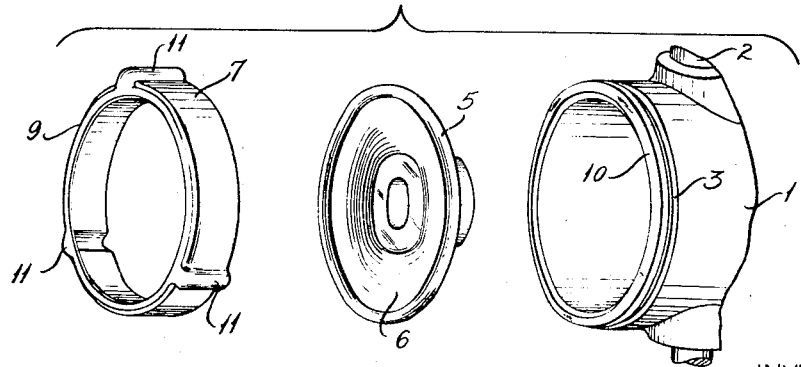
Figure 3 is a perspective of a disassembled view of the cylinder and closure members.

Referring now to the several figures of the drawings, numeral 1 designates a pressure fluid motor known in the art as a brake cylinder having a boss 2 thereon suitably ported to receive a conduit by means of which pressure fluid is introduced into the cylinder, it being understood that the cylinder is provided with the usual internal mechanism for the actuation of brake shoes or other parts to which motion is to be imparted. Lugs 4—4 on cylinder 1 are for the purpose of securing cylinder 1 to the backing plate or mounting means.

The cylinder is provided with a circumferential groove 3 near each end and both extremities 10 of the cylinder are suitably machined to accommodate the pyramidic portion or head 5 on the flexible rubber closure 6. The cap 7, preferably formed of comparatively thin cross-section drawn steel, is shown fitted over the end of the cylinder and rubber closure. Cap 7 is formed with a groove 9 in the manner indicated to also receive the pyramidic portion 5 of rubber closure 6, and is shaped to insure intimate contact between closure 6 and the machined end 10 of the slave cylinder. The portion 5 is disposed in a correspondingly shaped space formed by the groove 9 of the cap and the ends 10 of cylinder 1. This space receiving the pyramidic portion 5 restrains any tendency toward possible inward radial movement of the flexible member 6.

The axially extended portion of cap 7 is provided with a plurality of upstruck lugs 11 which permit radial expansion and contraction of the cap 7. When the cap has been installed in place on the cylinder, the rear of the axial skirt is clinched, as at 8, in several places deforming it to conform to the circumferential groove 3. These deformations 8 insure intimate association of the closure 6 with the machined end 10 of the cylinder as indicated in Figure 1. The deformations 8 also prevent any axial movement between cylinder 1 and cap 7.

The cap 7 protects the flexible rubber closure 6 from damage by grit or other foreign material and from sparks produced by braking action.

Piston rods 12 are provided for the pistons in the cylinder and extend through the aperture in the flexible member 6 to engage parts to be actuated such as brake shoes.

Having fully described my invention, that which I claim as novel and desire to protect by Letters Patent of the United States is:

1. A protective mechanism for a cylinder comprising a flexible member disposed adjacent the end of said cylinder and having an aperture therein to receive a piston rod; a cap receivable over the end of said cylinder; means on said cap engageable with a circumferential groove in the cylinder to prevent relative axial motion between the cylinder and cap; a pyramidic circumferential section on the outer periphery of said closure to cooperate with means on said cap to hold said flexible member firmly against the end of said cylinder; and upstruck members on said cap to allow diametrical expansion of said cap relative to said cylinder.

2. A protective mechanism for a cylinder having an externally chamfered end comprising a flexible closure member with a bead at its radial extremity disposed adjacent the end of said cylinder and having an aperture therein for receiving a piston rod; a cap fitted over the end of said cylinder; means on said cap engageable with the cylinder for preventing relative axial movement between said cap and cylinder; a second means on said cap for firmly holding said flexible closure member in position against the end of said cylinder and for forcing said bead into engagement with said chamfered end; and means including upstruck portions formed in said cap for allowing the cap to be radially expanded and contracted.

3. A protective mechanism for a cylinder having an external circumferential groove adjacent to an externally chamfered end comprising a flexible closure member provided with a peripheral circumferential bead disposed adjacent to and in engagement with the chamfered end of said cylinder and having an aperture therein for receiving a piston rod; a cap receivable over the end of said cylinder and having a circumferential recess opposite said chamfered end for receiving a portion of said bead; means on said cap engageable with the circumferential groove for preventing relative axial motion between said cylinder and cap and for forcing said closure member against said cylinder end; and means including upstruck members formed on said cap for allowing radial expansion of the cap relative to said cylinder.

4. A protective mechanism for a cylinder having a chamfered outer circumferential end section comprising a flexible closure member with a pyramidic circumferential section on its periphery disposed adjacent the end of said cylinder in said chamfered section; a cap receivable over the end of said cylinder; means on said cap for preventing relative axial movement between said cap and cylinder; and means on said cap for securing said pyramidic section in said chamfered section of said cylinder.

LEONARD G. NAUMANN.

REFERENCES CITED

The following references are of record in the file of this patent:

UNITED STATES PATENTS

| Number | Name | Date |
|---|---|---|
| 1,786,912 | Madden | Dec. 30, 1930 |
| 1,793,024 | Scofield | Feb. 17, 1931 |
| 1,882,995 | Scofield | Oct. 18, 1932 |
| 1,884,374 | Tatter | Oct. 25, 1932 |
| 2,157,867 | Robertson et al. | May 9, 1939 |
| 2,170,574 | Sanzedde | Aug. 22, 1939 |
| 2,430,064 | Lawson | Nov. 4, 1947 |